United States Patent
Anderson et al.

(10) Patent No.: US 7,061,681 B2
(45) Date of Patent: Jun. 13, 2006

(54) FABRY-PEROT INTERFEROMETER

(75) Inventors: Daryl E. Anderson, Corvallis, OR (US); Andy L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 10/790,120

(22) Filed: Mar. 2, 2004

(65) Prior Publication Data

US 2005/0195400 A1  Sep. 8, 2005

(51) Int. Cl.
*G02B 27/00* (2006.01)
(52) U.S. Cl. ............... 359/579; 359/260; 359/578; 356/454; 356/506; 356/519
(58) Field of Classification Search ......... 359/260, 359/577–578, 290–291; 356/519, 480, 454, 356/506
See application file for complete search history.

(56) References Cited

U.S. PATENT DOCUMENTS

| | | | |
|---|---|---|---|
| 5,452,121 A * | 9/1995 | Hilgeman | 359/260 |
| 6,400,738 B1 * | 6/2002 | Tucker et al. | 372/20 |
| 6,608,685 B1 | 8/2003 | Wood et al. | |
| 2001/0028503 A1 * | 10/2001 | Flanders et al. | 359/578 |
| 2005/0078906 A1 * | 4/2005 | Lunt et al. | 385/15 |

* cited by examiner

*Primary Examiner*—Leonidas Boutsikaris

(57) ABSTRACT

A method of tuning a resonant cavity of an FP (Fabry-Perot) interferometer in a DLD (diffractive light device) MEMS (microelectromechanical system) device, wherein the FP interferometer has a top plate and a bottom plate, and wherein the method comprises; using first and second electromechanical transducers to independently change a distance between the top and bottom plates of the FP interferometer.

24 Claims, 2 Drawing Sheets

FABRY-PEROT INTERFEROMETER

BACKGROUND OF THE INVENTION

A Fabry-Perot (FP) interferometer is a multiple-beam interferometer, usually consisting of two flat plates, one of which is light transmissive and the other of which is highly reflective. The two flat plates are set parallel to one another by spacers so that light waves may bounce back and forth between them multiple times. The interferometer makes use of multiple reflections between the two closely spaced flat plate surfaces. A resonant cavity or gap of the interferometer is a region bounded by the two flat plates, which in turn is adjusted or tuned to provide multiple reflections of light waves.

Typically, a large number of interfering light waves produces an interferometer with extremely high resolution. Because of the high resolution power, the FP interferometer is widely used as a spectrometer for the accurate measurement of the hyperfine structure of spectral lines. The FP interferometer is also used as a laser resonator, since it reinforces only light of specific frequencies traveling perpendicular to the mirror surfaces. It is advantageous to fine tune the resonant cavity of the interferometer to achieve high resolution.

DETAILED DESCRIPTION OF THE EMBODIMENTS

Figure 1:
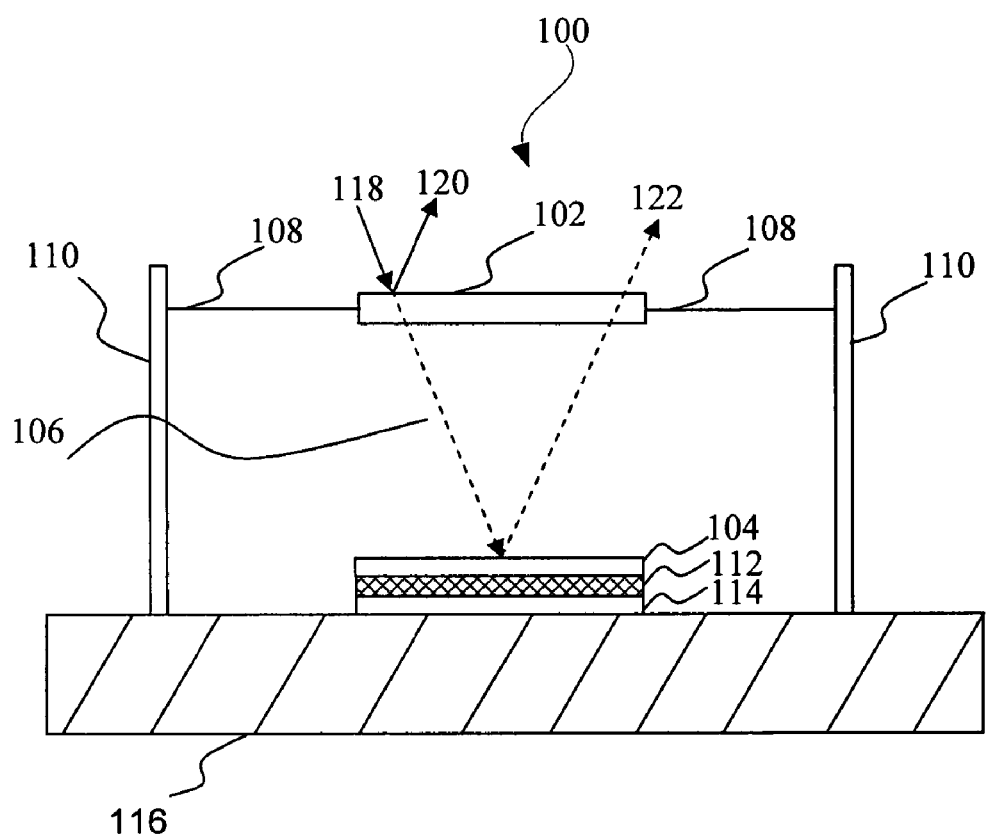
FIG. 1 is a schematic diagram of a FP interferometer which is provided with first and second resonance cavity adjusting electromechanical transducers according to an embodiment of the invention.
Figure 2:
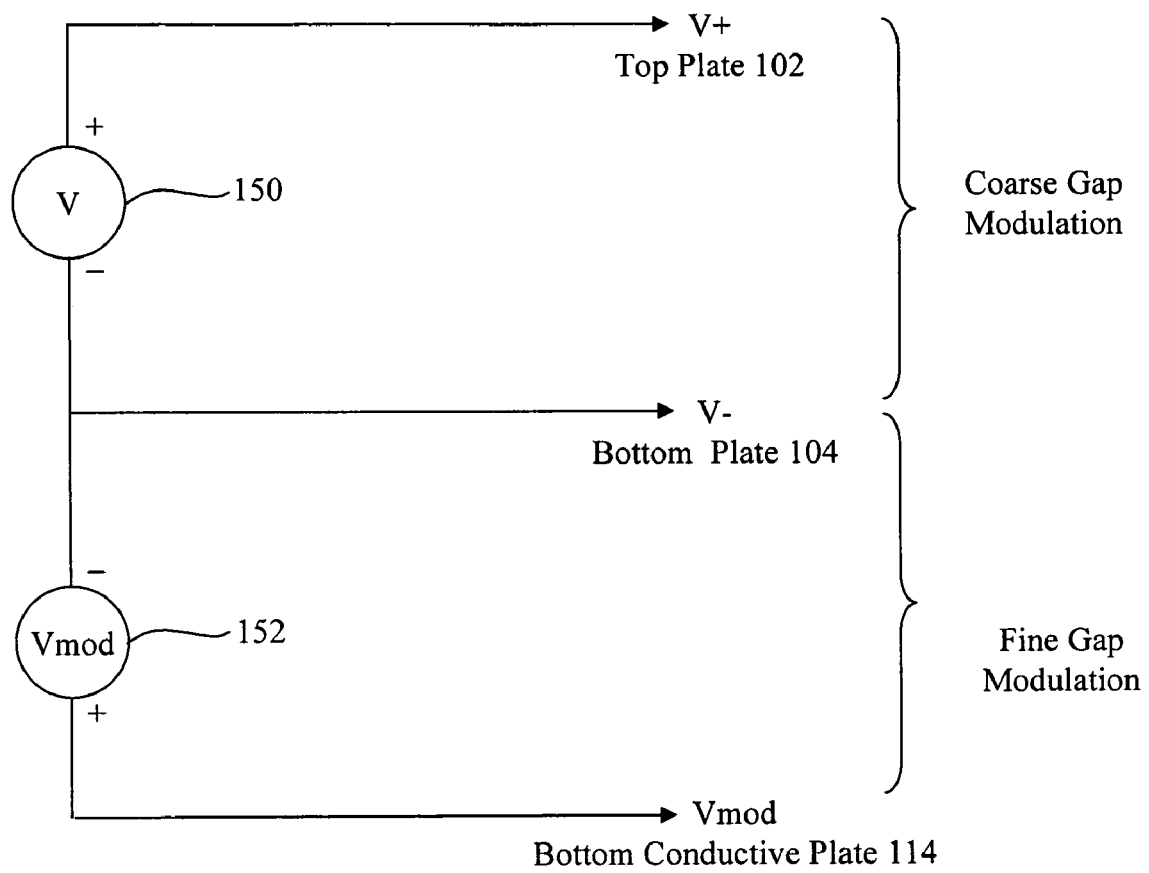
FIG. 2 shows a circuit arrangement for controlling the first and second electromechanical transducers.

FIGS. 1 and 2 are provided for illustration purposes only and are not intended to limit the present invention. Given the following disclosure one skilled in the art to which the present invention pertains or most closely pertains would recognize the various modifications and alternatives, all of which are considered to be a part of the present invention.

FIG. 1 represents an embodiment of an FP interferometer 100 which includes a top plate 102 and a bottom plate 104. The region bounded by the top plate 102 and the bottom plate 104 is a resonant cavity/gap 106. The top plate 102 is supported by flexures 108, which in turn are supported by posts 110. The height of the resonant cavity 106 is controlled by first and second electromechanical transducers. The first electromechanical transducer comprises the top plate 102, the bottom plate 104 and flexures 108 which resiliently support the top plate 102 over the bottom plate 104. This first electromechanical transducer, which functions as a linear acting motor, controls the height of the resonance cavity 106 by inducing a first relative displacement through a balance of electrostatic forces between the top plate 102 and the bottom plate 104, and mechanical spring forces of flexures 108. The top plate 102 and the bottom plate 104 act as first and second electrodes of a capacitor. By varying a voltage applied to the top plate 102, the distance between the top plate 102 and the bottom plate 104 can be varied and the height of the resonant cavity 106 can be tuned/adjusted essentially to a desired value.

The second electromechanical transducer is associated with the bottom plate 104 and induces a second relative displacement between the top and bottom plates 102, 104, which is substantially independent of the first relative displacement, when energized. According to one embodiment, the second electromechanical transducer comprises a piezo-electric element 112.

The piezo-electric element 112 may comprise a single layer or plurality of layers. A bottom conductive plate 114 supports and provides an electrical connection for the piezo-electric element 112. The piezo-electric element 112 is disposed between the bottom plate 104 of the FP interferometer 100 and the bottom conductive plate 114. The hatched area 116 may include control circuitry and substrate.

In one embodiment, the top plate 102 is semi-transparent and the bottom plate 104 is reflective. An arrow 118 indicates light entering on the top plate 102. Arrows 120 and 122 indicate light exiting from the top plate 102 and the bottom plate 104, respectively. The color output of a DLD (diffractive light device) MEMS (microelectromechanical system) device is controlled through the interference between light rays 120 and 122. The invention therefore finds application in such a device in that the use of the two electromechanical transducers permit fine control over the interference and thus the colors which are produced.

In one embodiment, the top plate 102 may be made from silicon dioxide. The bottom plate 104 and the bottom conductive plate 114 may comprise aluminum or an alloy of aluminum/tantalum. The piezo-electric element 112 may comprise zinc oxide or any other suitable piezo-electric material. The flexures 108 may comprise an alloy of aluminum/titanium and may act as electrodes for supplying a voltage to the top plate 102. However, the above materials are not limiting on the invention and any other suitable materials can also be used.

The FP interferometer 100 can be built using standard micro-electronic fabrication techniques such as photolithography, vapor deposition and etching. However, the above techniques are not limiting on the invention and any other suitable techniques can also be used. The disclosure of copending application entitled "Optical Interference Pixel Display with Charge Control", filed on Apr. 30, 2003 and Ser. No. 10/428,261, which relates to the fabrication of an interferometer of the type to which the embodiments of the invention are directed, is hereby incorporated by reference as an example of a fabrication technique.

In this embodiment, a method of fine tuning the resonant cavity 106 of the FP interferometer 100 is accomplished by changing the distance between the top plate 102 and the bottom plate 104 by using the piezo-electric element 112 between the bottom plate 104 and the bottom conductive plate 114. When voltage is applied across the bottom plate 104 and the bottom conductive plate 114, in one polarity, the piezo-electric element 112 will expand, decreasing the height of the resonant gap 106, which in turn decreases the distance between the top plate 102 and bottom plate 104. When voltage is applied in opposite polarity, the piezo-electric element 112 will contract, increasing the height of the resonant gap 106, which in turn increases the distance between the top plate 102 and bottom plate 104. These geometric modifications of the resonant gap 205, which are smaller than those induced by the linear acting motor (i.e. the first electromechanical transducer) comprised of the top plate 102 and the bottom plate 104, can be achieved with a much higher slew rate and can be used to enable accurate tuning of the resonant cavity 106.

Referring to FIG. 2, one embodiment of a circuit arrangement for controlling the first and second electromechanical transducers is disclosed. The circuit arrangement comprises first and second voltage sources for controlling the first and second electromechanical transducers respectively. The first voltage source, 150 is connected across the top plate 102 and the bottom plate 104, whereas the second voltage source, 152 is connected across the bottom plate 104 and the bottom conductive plate 114. In this arrangement the bottom plate 104 is used as a common or ground. Though the bottom plate voltage V− need not be held at zero volts (as ground might imply), it is generally held steady while a top plate voltage V+ and a bottom conductive plate voltage Vmod are modulated. Thus, for the first stage of adjustment, the top plate 102 is moved for achieving what shall be referred to as "coarse" gap modulation. This is achieved by varying the top plate voltage V+. The second stage of adjustment uses the piezo-electric element 112 to provide what shall be referred to as "fine" gap modulation. This fine gap modulation is achieved by the bottom conductive plate voltage, Vmod, being adjusted and, in this instance, the bottom plate voltage, V−, being held constant.

The foregoing description of various embodiments of the invention has been presented for purposes of illustration and description. It is not intended to be exhaustive or to limit the embodiments of invention disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. The scope of the invention is limited only by the appended claims.

What is claimed is:

1. A device, comprising;
   a FP (Fabry-Perot) interferometer comprising a top plate, a bottom plate, and a resonant cavity defined between the top plate and the bottom plate wherein the top plate is suspended with respect to the bottom plate so that the top plate is relatively movable with respect to the bottom plate;
   a first electromechanical transducer which is associated with the top and bottom plates and which induces a first relative displacement between the top and bottom plates, when energized; and
   a second electromechanical transducer which is associated with the bottom plate and which induces a second relative displacement between the top and bottom plates which is substantially independent of the first relative displacement, when energized.

2. The device as defined in claim 1, wherein the device is a DLD (diffractive light device) MEMS (microelectromechanical system) device.

3. The device as defined in claim 1, wherein the first electromechanical transducer comprises a linear acting motor wherein the top and bottom plates respectively act as first and second electrodes of a capacitor between which an electrostatic force is developed.

4. The device as defined in claim 1, wherein the second electromechanical transducer comprises a piezo-electric element.

5. The device as defined in claim 4, wherein the piezo-electric element comprises one layer.

6. The device as defined in claim 4, wherein the piezo-electric element comprises multiple layers.

7. The device as defined in claim 4, wherein the piezo-electric element comprises zinc oxide.

8. The device as defined in claim 4, further comprises a bottom conductive plate which respectively supports and provides an electrical connection for the piezo-electric element.

9. The device as defined in claim 8, wherein the piezo-electric element is disposed between the bottom plate of the FP interferometer and the bottom conductive plate.

10. The device as defined in claim 1, wherein the top plate of the FP interferometer is supported by flexures.

11. The device as defined in claim 1, wherein the top plate is semi-transparent and the bottom plate is reflective.

12. The device as defined in claim 1, further comprising a circuit which controls the first and second electromechanical transducers.

13. The device as defined in claim 12, further comprising a bottom conductive plate which supports and provides an electrical connection for the second electromechanical transducer and wherein the circuit comprises;
   a first voltage source connected across the top and bottom plates for variably supplying a voltage there across; and
   a second voltage source connected across the bottom and bottom conductive plates for variably supplying a voltage there across.

14. A method of tuning a resonant cavity of an FP (Fabry-Perot) interferometer in a DLD (diffractive light device) MEMS (microelectromechanical system) device, wherein the FP interferometer has a top plate and a bottom plate, and wherein the method comprises;
   using first and second electromechanical transducers to independently change a distance between the top and bottom plates of the FP interferometer.

15. The method as defined in claim 14, wherein the step of changing the distance between the top and bottom plates of the FP interferometer comprises;
   inducing a first relative displacement between the top and bottom plates using the first electromechanical transducer, when energized; and
   inducing a second relative displacement which is substantially independent of the first relative displacement between the top and bottom plates using the second electromechanical transducer, when energized.

16. The method as defined in claim 14, wherein the step of changing the distance between the top and bottom plates of the FP interferometer comprises;
   locating the second electromechanical transducer below the bottom plate of the FP interferometer; and
   energizing the second electromechanical transducer with a modulating voltage.

17. The method as defined in claim 16, wherein the first electromechanical transducer comprises a linear acting motor wherein the top and bottom plates respectively act as first and second electrodes of a capacitor between which an electrostatic force is developed.

18. The method as defined in claim 16, wherein the second electromechanical transducer comprises a piezo-electric element.

19. The method as defined in claim 14, wherein the step of changing the distance between the top and bottom plates of the FP interferometer further comprising;
   controlling a top plate voltage for achieving a first stage adjustment; and
   controlling a bottom conductive plate voltage for achieving a second stage adjustment.

20. The method as defined in claim 19, wherein the first stage adjustment comprises a coarse gap modulation and the second stage adjustment comprises a fine gap modulation.

21. An apparatus for fine tuning a resonant cavity of an FP (Fabry-Perot) interferometer in a DLD (diffractive light device) MEMS (microelectromechanical system) device, comprising;

FP interferometer means including a top plate and a bottom plate; and first and second electromechanical transducer means for independently changing a distance between the top and bottom plates of the FP interferometer.

22. The apparatus as defined in claim 21, wherein the first and second electromechanical transducer means for changing the distance between the top and bottom plates of the FP interferometer respectively comprise;

linear acting motor means for inducing a first relative displacement between the top and bottom plates, when energized; and reaction means for inducing a second relative displacement between the top and bottom plates which is independent of the first relative displacement, when energized.

23. The apparatus as defined in claim 22, wherein the linear acting motor comprises means for applying a voltage to the top and bottom plates respectively so that the top and bottom plates act as first and second electrodes of a capacitor between which an electrostatic force is developed.

24. The apparatus as defined in claim 22, wherein the reaction means comprises;

piezo-electric element means disposed below the bottom plate of the FP interferometer; and means for energizing the piezo-electric element with a modulating voltage.

* * * * *